(12) United States Patent
Hovav (10) Patent No.: US 8,929,913 B2
(45) Date of Patent: *Jan. 6, 2015

(54) SYSTEM AND METHOD FOR EMPLOYING GEOGRAPHICALLY OVERLAPPING AUTONOMOUS STATIC AND MOBILE WIRELESS NETWORKS FOR ASSET TRACKING

(76) Inventor: Shmuel Hovav, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/229,778

(22) Filed: Sep. 12, 2011

(65) Prior Publication Data

US 2013/0065603 A1 Mar. 14, 2013

(51) Int. Cl.
*H04W 24/00* (2009.01)
*H04W 4/02* (2009.01)
*H04W 84/18* (2009.01)

(52) U.S. Cl.
CPC .............. *H04W 4/028* (2013.01); *H04W 84/18* (2013.01)
USPC .................. 455/456.1; 455/404.2; 455/456.3; 455/414.2

(58) Field of Classification Search
CPC ... H04W 64/00; H04W 4/02; H04L 29/08657
USPC ...................... 455/456.1, 404.2, 456.3, 414.2
See application file for complete search history.

(56) References Cited

U.S. PATENT DOCUMENTS

| 7,411,921 B2* | 8/2008 | Strong et al. ................... 370/328 |
| 7,724,238 B2* | 5/2010 | Daniel et al. ................... 345/163 |
| 2009/0128303 A1* | 5/2009 | Hovav et al. ............. 340/286.01 |

* cited by examiner

*Primary Examiner* — Nghi H Ly (57) ABSTRACT

A supply and distribution chain and various systems, methods and elements associated with autonomous static and mobile wireless networks for asset tracking. In one embodiment, the chain includes: (1) masters associated with static sites and configured to establish autonomous static networks for the static sites, (2) mobile units associated with carriers and configured to join the autonomous static networks when in range thereof and create autonomous mobile networks when out of range of the autonomous static networks and (3) sensors associated with assets and configured to join the autonomous static networks when in range thereof and join the autonomous mobile networks when out of range of the autonomous static networks.

10 Claims, 8 Drawing Sheets

SYSTEM AND METHOD FOR EMPLOYING GEOGRAPHICALLY OVERLAPPING AUTONOMOUS STATIC AND MOBILE WIRELESS NETWORKS FOR ASSET TRACKING

CROSS-REFERENCE TO RELATED APPLICATION

This is a divisional application that claims priority based on U.S. Provisional Patent Application Ser. No. 60/988,146, filed by Hovav on Nov. 15, 2007, entitled "System and Method for Achieving Cooperation Among Geographically Overlapping Autonomous and Mobile Wireless Networks," commonly assigned with this application and incorporated herein by reference.

TECHNICAL FIELD

The invention is directed, in general, to asset tracking systems and, more specifically, to a system and method for employing geographically overlapping autonomous static and mobile wireless networks for asset tracking.

BACKGROUND

Modern channels of trade, frequently including international supply and distribution chains, are often highly complex, span thousands of miles and multiple transportation modes and convey valuable goods from sources to destinations all over the world. A typical supply and distribution chain often begins at a manufacturing plant, where goods are fabricated and loaded into shipping containers for transportation by truck or train to a sea port. At the port, the shipping containers are loaded onto ships and transported across various bodies of water. Once they reach their destination, the ships are unloaded, and the shipping containers again shipped overland by truck or train to one or more rail yards and then to distribution centers. The goods are then typically broken up into smaller lots, perhaps into separate pallets or boxes and loaded onto trucks for their final destinations, which are often retail stores or other manufacturing plants.

It is apparent that the risk of misplacement, loss or theft of the goods abounds given the many static sites and transportation modes employed in a typical supply and distribution chain. The risk of sabotage or terrorism also looms as shipping containers lie idle in ports, yards and distribution centers. Sophisticated, expensive and labor-intensive tracking systems exist for identifying and locating goods in such chains. However, these systems fail to offer end-to-end tracking and require excessive human intervention and maintenance, severely diminishing their effectiveness. As a result, despite the sophistication of such systems and the sheer amount of money, time and effort that are spent on them, goods are still lost, misplaced or stolen every day.

SUMMARY

One aspect of the invention provides a supply and distribution chain. In one embodiment, the chain includes: (1) masters associated with static sites and configured to establish autonomous static networks for the static sites, (2) mobile units associated with carriers and configured to join the autonomous static networks when in range thereof and create autonomous mobile networks when out of range of the autonomous static networks and (3) sensors associated with assets and configured to join the autonomous static networks when in range thereof and join the autonomous mobile networks when out of range of the autonomous static networks.

Another aspect of the invention provides an asset tracking infrastructure. In one embodiment, the network includes: (1) a master configured to establish an autonomous static network for a static site, (2) a mobile unit associated with a carrier and configured to join the autonomous static network when in range thereof and create an autonomous mobile network when out of range of the autonomous static network and other autonomous static networks, (3) a sensor associated with an asset and configured to join the autonomous static network when in range thereof and join the autonomous mobile network when in range thereof and out of range of the autonomous static network and the other autonomous static networks and (4) a locator configured to join the autonomous static network and thereafter provide data regarding a location of the sensor.

Yet another aspect of the invention provides a method of configuring an asset tracking infrastructure. In one embodiment, the network includes: (1) employing a master to establish an autonomous static network for a static site, (2) joining a locator to the autonomous static network, (3) joining a sensor associated with an asset to the autonomous static network when the sensor is in range thereof and (4) thereafter employing the locator to provide data regarding a location of the sensor.

Still another aspect of the invention provides a method of configuring a wireless network. In one embodiment, the method includes: (1) calculating a best quality path at each node based on link qualities and best quality paths among adjacent nodes and (2) routing messages through nodes of said network based on said best quality path at said each node.

Yet still another aspect of the invention provides a sensor associated with an asset. In one embodiment, the sensor includes: (1) a processor coupled to the motion detector and the wireless network interface and configured to enter and exit a low-power mode, (2) a stimulus detector configured to provide a signal to the processor indicating movement of the asset and cause the processor to exit the low-power mode and (3) a wireless network interface configured to respond to the processor by broadcasting a signal indicating the movement, the signal free of absolute geolocation data.

Still yet another aspect of the invention provides a method of determining a location of an asset. In one embodiment, the method includes: (1) stimulating a stimulus detector associated with the asset, the stimulus indicating movement of the asset, (2) broadcasting a signal indicating the stimulating, (3) receiving the signal at a locator and (4) determining the location based on a location of the locator.

Still another aspect of the invention provides a mobile unit associated with a carrier. In one embodiment, the mobile unit includes: (1) a wireless network interface, (2) a geolocating system configured to provide an absolute geolocation of the mobile unit and (3) a processor configured to employ the wireless network interface to join an autonomous static network when in range thereof, create an autonomous mobile network when out of range of the autonomous static network and other autonomous static networks and accept at least one sensor into the autonomous mobile network and further configured to employ the geolocating system to obtain geolocation data regarding the carrier.

Yet another aspect of the invention provides a method of operating a mobile unit. In one embodiment, the method includes: (1) employing a wireless network interface to join an autonomous static network when in range thereof, (2) employing the wireless interface to create an autonomous mobile network when out of range of the autonomous static network and other autonomous static networks, (3) accepting at least one sensor into the autonomous mobile network and (4) employing a geolocating system to obtain geolocation data regarding the carrier.

Still another aspect provides an apparatus for enabling tracking of an asset transported by a carrier outside of a coverage area of an autonomous static network. In one embodiment, the apparatus includes: (1) a sensor associated with the asset, the sensor including: (1a) a memory, wherein the memory stores data identifying the asset with which the sensor is associated, (1b) a first wireless network interface that enables communication between the sensor and other apparatus that is part of an autonomous mobile network, (1c) a processor, the processor adapted to cause communication of an asset identification signal representing the data identifying the asset from the first wireless network interface in response to a specified activation criterion or criteria and (1d) a power supply for producing power to enable operation of the sensor; and (2) a receiver, including: (2a) a second wireless network interface that enables communication between the receiver and the sensor via the autonomous mobile network, wherein the asset identification signal can be received by the receiver via the second wireless network interface and (2b) a mobile unit interface that enables communication between the receiver and a mobile unit that is associated with the carrier, the mobile unit adapted to identify the location of the mobile unit and to communicate with apparatus that is remote from the carrier, wherein the data identifying the asset can be communicated from the receiver to the mobile unit to enable the data and a location of the mobile unit to be communicated to the remote apparatus, thereby enabling the location of the asset to be tracked.

Still yet another aspect provides an apparatus for enabling tracking of an asset within a coverage area of an autonomous static network. In one embodiment, the apparatus includes: (1) a sensor associated with the asset, the sensor including: (1a) a memory, wherein the memory stores data identifying the asset with which the sensor is associated, (1b) a first wireless network interface that enables communication between the sensor and other apparatus that is part of an autonomous mobile network, (1c) a stimulus detector for detecting motion of the sensor, (1d) a processor, the processor adapted to cause communication of an asset identification signal representing the data identifying the asset from the first wireless network interface in response to detection of motion of the sensor and (1e) a power supply for producing power to enable operation of the sensor and (2) a locator associated with a static site vehicle, the locator including: (2a) a second wireless network interface that enables communication between the locator and the sensor via the autonomous static network, wherein the asset identification signal can be received by the locator via the second wireless network interface, (2b) a geolocating system that enables identification of the location of the locator, (2c) a processor, the processor adapted to determine the strength of the asset identification signal and (2d) a wireless network interface that enables communication with apparatus that is remote from the static site vehicle, wherein data regarding the asset identification signal and the location of the locator can be communicated from the locator to the remote apparatus, thereby enabling the location of the asset to be tracked.

Still another aspect provides an apparatus for enabling tracking of an asset. In one embodiment, the apparatus includes: (1) a sensor associated with the asset, the sensor storing data identifying the asset with which the sensor is associated and enabling communication to an asset tracking network, in response to a specified activation criterion or criteria, of an asset identification signal representing the data identifying the asset, (2) autonomous static network apparatus, associated with a static site vehicle, that enables receipt of communication of an asset identification signal when the sensor is within range of the autonomous static network apparatus, determination of the strength of the asset identification signal, identification of the location of the autonomous static network apparatus, and communication of data regarding the asset identification signal and autonomous static network apparatus location to apparatus that is remote from the static site vehicle and (3) autonomous mobile network apparatus, associated with a carrier, that enables receipt of communication of an asset identification signal, identification of the location of the autonomous mobile network apparatus, and communication of the asset identification and autonomous mobile network apparatus location to apparatus that is remote from the carrier.

BRIEF DESCRIPTION OF THE DRAWINGS

For a more complete understanding of the invention, reference is now made to the following descriptions taken in conjunction with the accompanying drawings, in which.

DETAILED DESCRIPTION

Figure 1:
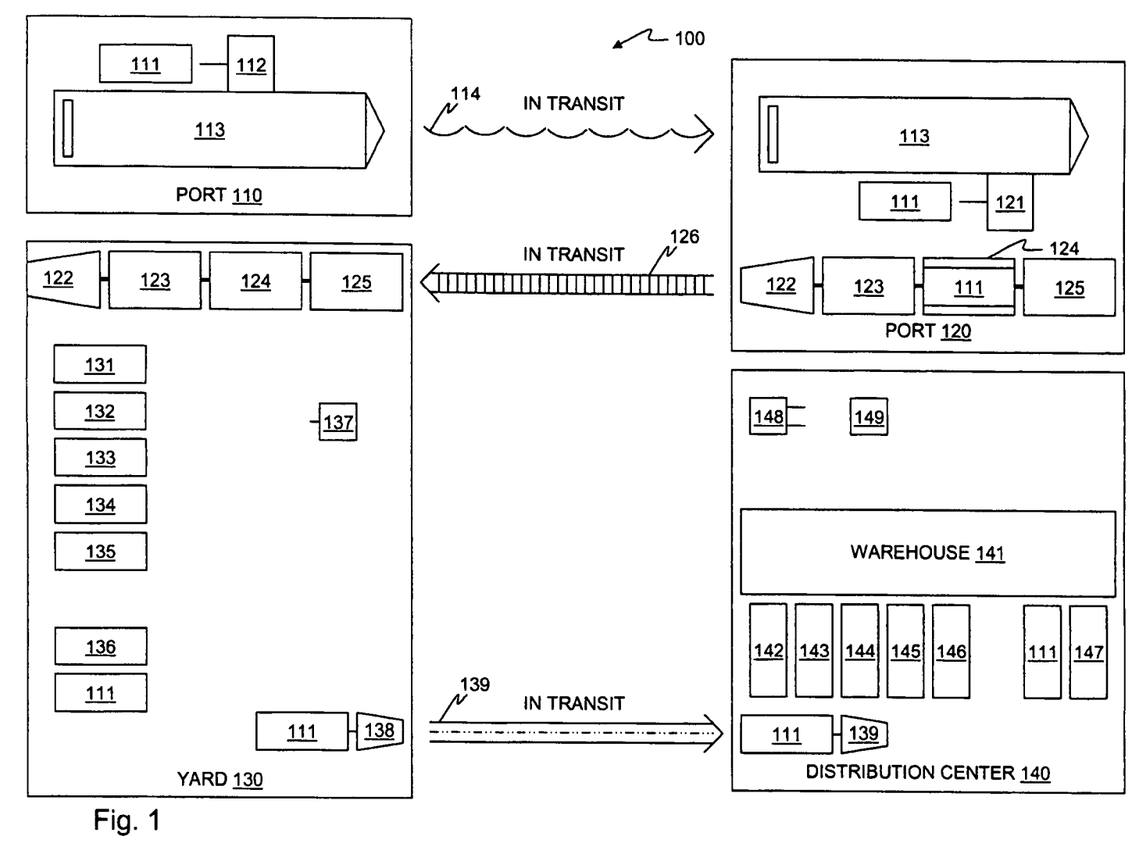
FIG. 1 is a highly schematic diagram of one example of a supply and distribution chain having multiple static sites and carriers transiting between the static sites.

FIG. 1 is a highly schematic diagram of one example of a supply and distribution chain 100 having multiple static sites and carriers transiting between the static sites, the carriers exemplifying typical modes of transportation. The various static sites, carriers and equipment at the static sites are set forth as an example only and not by way of limitation. The chain 100 is illustrated as originating at a first port 110, where a shipping container 111 is loaded by a crane 112 onto a ship 113. The ship 113 then transits an ocean 114 and arrives at a second port 120.

A crane 121 unloads the shipping container 111. Whether immediately thereafter or following some storage delay, the shipping container 111 is loaded onto a train having an engine 122 and several cars 123, 124, 125. The train transits tracks 126 and arrives at a yard 130, where the shipping container 111 is offloaded and stored in a line of other shipping containers 131, 132, 133, 134, 135, 136. The shipping container may be outfitted with wheels to allow it to be towed. Trailers that are not shipping containers may also be present at the yard 130. A static site vehicle, such as a crane (not shown) or a tow vehicle (also called a "mule") 137 may move and arrange the various shipping containers 111, 131, 132, 133, 134, 135, 136 as desired. Finally, the shipping container 111 is hitched to a truck 138. The truck 138 transits a road 139 and arrives at a distribution center 140.

The distribution center 140 includes a warehouse 141 having unreferenced truck bays at which are parked various shipping containers 142, 143, 144, 145, 146, 147, including the shipping container 111. The distribution center 140 may serve as a terminus for the shipping containers 111, 142, 143, 144, 145, 146, 14, or they may be en route for still other static sites. A static site vehicle, such as a forklift 148, may be employed to unload the shipping containers 111, 142, 143, 144, 145, 146, 147 and may move smaller units of goods contained therein in crates or boxes or on pallets 149.

Various conventional asset tracking systems exist that are able to cover only portions of the supply and distribution chain 100. One conventional asset tracking system for only the static sites is provided by WhereNet of Santa Clara, Calif. (www.wherenet.com). WhereNet employs receivers scattered about a static site to perform basic signal triangulation by measuring the time-of-arrival of signals emanating from beacons placed on containers and trailers. Two significant disadvantages result from this approach: infrastructure cost is high since many receivers are required to obtain accurate measurements, and beacon signal reflections (e.g., multipath) invalidate many triangulation calculations. To improve the calculations, WhereNet advises that the beacons be placed on top of the containers and trailers, which is very inconvenient, particularly for static sites where beacons are added as containers and trailers enter and removed as they leave.

Another conventional asset tracking system for only the static sites is provided by PINC Solutions or Berkeley, Calif. (see, pincsolutions.com). PINC Solutions uses a locator truck that drives around the static site continually. Each beacon on each container is essentially a Radio-Frequency Identification (RFID) tag. As the locator truck drives by each container and trailer, it reads the tag and logs the its location. Unfortunately, while RFID tags are relatively inexpensive, owning and operating the locator truck is not. Further, the locator truck must drive within a few feet of the RFID tag to read it. Still further, the location data for a given container or trailer is only as good as the last time the locator truck drove by it. To be more precise, updated locations of moved containers and trailers are not available until the locator truck passes by the container or trailer in its new position. Increasing data quality means increasing the amount of time the locator truck is driven around, increasing operating expense.

One conventional asset tracking system for use when containers and trailers are in transit is provided by SkyBitz of Sterling, Va. (see, www.skybitz.com). SkyBitz employs full mobile geolocation and communication hardware on each container and trailer to receive Global Positioning Satellite (GPS) data and communicate the identity of a trailer and its location over a satellite or cellular network to a central data collection server. Two significant disadvantages result from using this much hardware: the system is very expensive to implement, and, because battery power consumption is high, the system is expensive to operate. It would be desirable to decrease the hardware cost for each container and trailer to perhaps $\frac{1}{10}^{th}$ and decrease battery power consumption such the battery size could be reduced to $\frac{1}{100}^{th}$ of the size and still operate the hardware 20 to 30 times longer.

Unfortunately, the above-described conventional asset tracking systems operate either only in static environments or only in mobile environments. No conventional asset tracking system is able to span both static and mobile environments.

Therefore, a novel solution is needed to the asset tracking issue the supply and distribution chain 100 presents.

Although FIG. 1 does not show it, various elements of autonomous static and mobile wireless networks that together cooperate to perform asset tracking may be included in the supply and distribution chain 100. Masters may be associated with static sites, including the first and second ports 110, 120, the yard 130 and the distribution center 140. The masters may be configured to establish autonomous static networks for each of the static sites.

Some static sites span too great an area to be covered by a master. Therefore, extenders may be associated with some of the static sites. The extenders may be configured to join the autonomous static networks that are associated with their respective static sites and act essentially as relays.

Mobile units may be associated with carriers, including the ship 113, the train (e.g., the engine 122) and the truck 138. The mobile units may be configured to join the autonomous static networks when in range of any of them. The mobile units may also be configured to create their own autonomous mobile networks when out of range of any of the autonomous static networks that exist at each of the static sites.

Sensors may be associated with assets. Assets is broadly defined to encompass any object that may be desired to track. For example, the sensors may be associated with (e.g., affixed to) the shipping containers 111, 131, 132, 133, 134, 135, 136, 142, 143, 144, 145, 146, 147, the crate, box or pallet 149 or perhaps the asset itself (e.g., when the asset is so large that it cannot be placed, or does not benefit from being placed, in a shipping container, crate or box or mounted on a pallet). The sensors may be configured to join the autonomous static networks when in range thereof and join the autonomous mobile networks when out of range of the autonomous static networks. Thus, as the goods transit a typical supply and distribution chain that includes static sites and carriers that convey the goods from one static site to another, the sensors join and disengage from corresponding autonomous networks.

As will be seen, tracking continues even though multiple autonomous networks are involved. A server may be coupled to the masters. The server may also be coupled to the mobile units, perhaps intermittently. The server may be configured to receive data from the masters and the mobile units and, in some embodiments, provide data to the masters and the mobile units to control various aspects of the autonomous static and mobile networks.

In various embodiments, locators may be employed to reduce the cost, size, complexity and power consumption of the sensors. The locators may be configured to join the autonomous static networks and thereafter provide data regarding locations of the sensors to the masters. The sensors therefore are not required to be equipped with location-sensing systems, such as Global Positioning Satellite (GPS) receivers. Locators may be included in the mobile units as well, allowing them to provide data regarding the location of the carrier as well as its cargo during transit.

Figure 2:
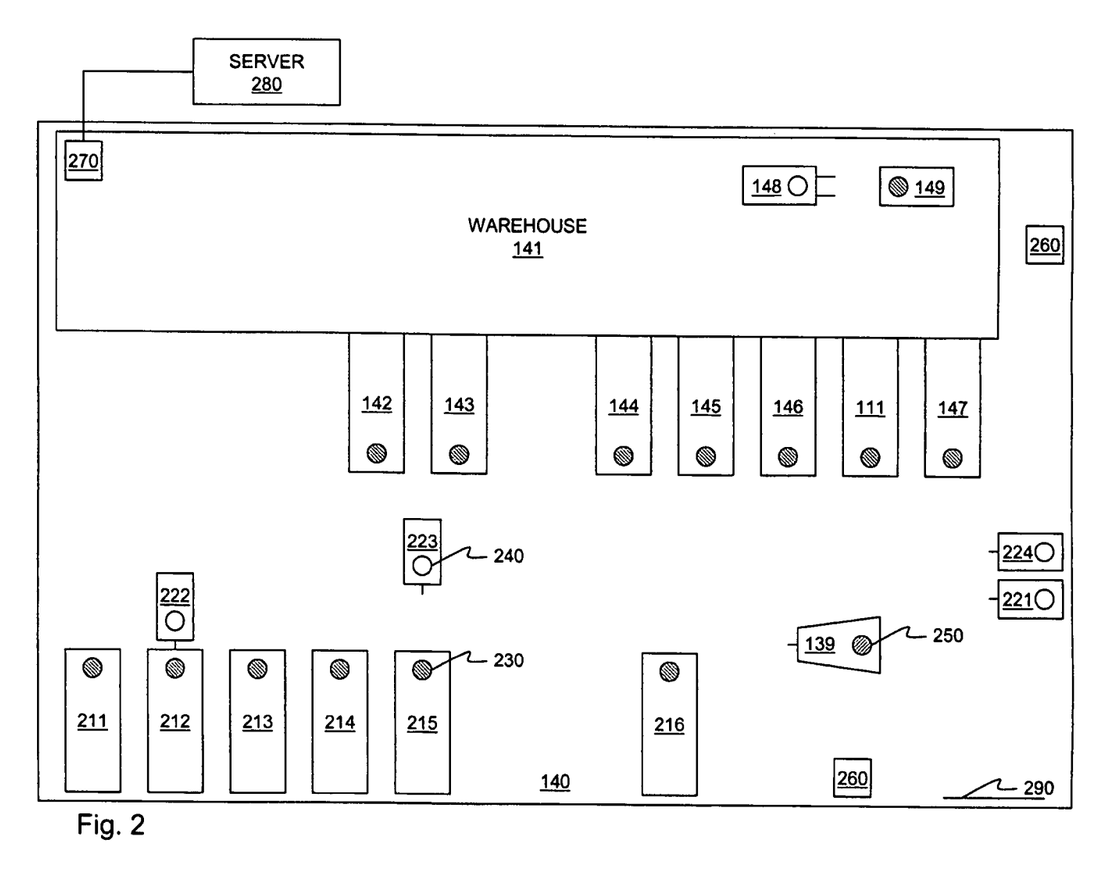
FIG. 2 is a highly schematic diagram of one example of a static site in the supply and distribution chain of FIG. 1, namely a distribution center.

FIG. 2 is a highly schematic diagram of one example of a static site in the supply and distribution chain of FIG. 1, namely the distribution center 140. FIG. 2 shows the warehouse 141, shipping containers 111, 142, 143, 144, 145, 146, 147 and truck 139 of FIG. 1 and also shows additional shipping containers 211, 212, 213, 214, 215, 216. Sensors are associated with the shipping containers 111, 142, 143, 144, 145, 146, 147, 211, 212, 213, 214, 215, 216. To keep FIG. 2 from being cluttered, only one of the sensors is referenced as 230. The sensors 230 may be affixed to any part of the shipping containers 111, 142, 143, 144, 145, 146, 147, 211, 212, 213, 214, 215, 216 and may be of any size, shape or configuration whatsoever. Not all shipping containers 111, 142, 143, 144, 145, 146, 147, 211, 212, 213, 214, 215, 216 need to have sensors 230, but tracking of that shipping container asset will be absent as a result. The sensors 230 need not be identical in terms of size, shape, configuration, make or model.

Various mules 221, 222, 223, 224 move the shipping containers 111, 142, 143, 144, 145, 146, 147, 211, 212, 213, 214, 215, 216 about the grounds of the distribution center 140. Forklifts, one of which is shown and referenced as 148, move crates, boxes and/or pallets, one of which is shown and referenced as 149, around the warehouse 141. Sensors may be associated with the crates, boxes and/or pallets as well. Cranes, none of which are shown in FIG. 2, may also be used to move the crates, boxes and/or pallets around the warehouse 141. Other types of static site vehicles may be at the static site 140.

Locators are associated with the mules 221, 222, 223, 224 and the forklift 148. To keep FIG. 2 from being cluttered, only one of the locators is referenced as 240. The locators 240 may be affixed to any part of the mules 221, 222, 223, 224, the forklift 148, and any other static site vehicles and may be of any size, shape or configuration whatsoever. Not all mules 221, 222, 223, 224 and forklifts 148 need to have locators 240, but sensor locating functionality will be absent as a result. The locators 240 need not be identical in terms of size, shape, configuration, make or model.

Though the truck 139 was illustrated in FIG. 1, FIG. 2 illustrates the truck 139 as having an associated mobile unit 250. The mobile unit 250 may be affixed to any part of the truck 139 and may be of any size, shape or configuration whatsoever. The truck 139 need to have a mobile unit 250, but autonomous mobile network functionality will be absent as a result. Mobile units 250 of different trucks need not be identical in terms of size, shape, configuration, make or model.

Extenders 260 are located about the grounds of the distribution center 140. Any number of extenders 260 may be employed in any appropriate location. Extenders 260 need not be identical in terms of size, shape, configuration, make or model.

A master 270 is located on or proximate the grounds of the distribution center 140, specifically in or on the warehouse 141 in the example of FIG. 2. In the illustrated embodiment, a single master 270 is employed at a given static site. The master is configured to establish an autonomous static network which, in the illustrated embodiment, is a wireless network. In one specific embodiment, the wireless network is a low-rate wireless personal area network (LR-WPAN) that operates according to IEEE 802.15.4-2206.

A server 280 may be located on the grounds of the distribution center 140. However, in the embodiment of FIG. 2, the server 280 is remote from the distribution center 140 and coupled to the master 270 by the Internet or another type of computer network.

Depending upon its ability to connect wirelessly to various network elements, the autonomous static network is established by the master 270 and encompasses the sensors 230, the locators 240, the mobile units 250, the extenders 260 and the master 270. One or more gate detectors 290 may be employed at the distribution center 140 as well and be encompassed by the autonomous static network. The gate detectors 290 may be capable of detecting passages of assets or other objects thereacross. Door detectors, window detectors and the like may also be employed, depending upon the configuration of a static site.

Figure 3:
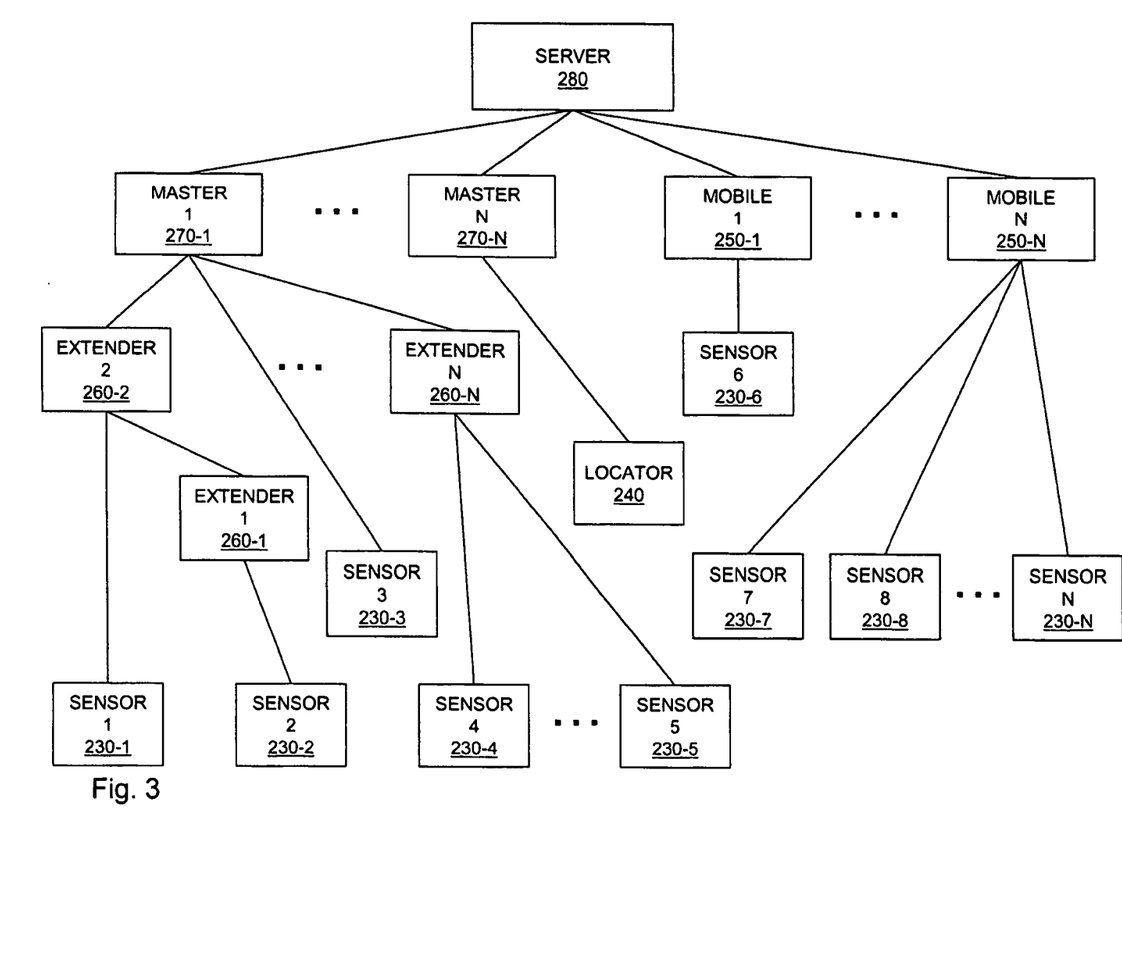
FIG. 3 is a block diagram of various embodiments of autonomous static and mobile wireless networks for asset tracking.

FIG. 3 is a block diagram of various embodiments of autonomous static and mobile wireless networks for asset tracking. As with FIGS. 1 and 2, FIG. 3 is only an example of a configuration of autonomous static and mobile wireless networks.

Various sensors 230-1, 230-2, 230-3, 230-4, 230-5, 230-6, 230-7, 230-8, . . . , 230-N are associated with assets that are desired to be tracked. In the illustrated embodiment, the sensors 230-1, 230-2, 230-3, 230-4, 230-5, 230-6, 230-7, 230-8, . . . , 230-N are configured to join an autonomous static network when in range thereof. In the illustrated embodiment, the sensors 230-1, 230-2, 230-3, 230-4, 230-5, 230-6, 230-7, 230-8, . . . , 230-N are further configured to join an autonomous mobile network when in range thereof and out of range of the autonomous static network and any other autonomous static networks.

A locator 240 is associated with a static site vehicle (e.g., cranes, mules, forklifts or any other mode of transportation designed to move objects around a single site). In the illustrated embodiment, the locator 240 is configured to join an autonomous static network associated with the static site and thereafter provide data regarding a location of the sensor.

Mobile units 250-1, . . . , 250-N are associated with carriers (e.g., ships, trains, trucks, airplanes or any other mode of transportation that travels between or among multiple static sites). In the illustrated embodiment, the mobile units 250-1, . . . , 250-N are configured to join an autonomous static network when in range thereof. In the illustrated embodiment, the mobile units 250-1, . . . , 250-N are further configured to create an autonomous mobile network when out of range of any autonomous static network.

Extenders 260-1, 260-2, . . . , 260-N are associated with static sites. In the illustrated embodiment, the extenders 260-1, 260-2, . . . , 260-N are configured to join autonomous static networks associated with the static sites and relay at least some of the data provided by the locator 240, among other data.

Masters 270-1, . . . , 270-N are associated with separate static sites. In the illustrated embodiment, the masters 270-1, . . . , 270-N are configured to establish an autonomous static network for a static site. FIG. 3 explicitly shows two autonomous static networks corresponding to two static sites. A first autonomous static network is established by the master 1 270-1 and contains the extenders 1, 2, . . . , N 260-1, 260-2, 260-N and the sensors 1, 2, 3, 4 and 5 230-1, 230-2, 230-3, 230-4, 230-5. A second autonomous static network is established by the master N 270-N and contains only the locator 240. FIG. 3 shows the locator 240 in direct wireless communication with the master N 270-N. It should be understood, however, that the locator 240 may be in indirect communication through one or more extenders (not shown).

FIG. 3 also explicitly shows two autonomous mobile networks corresponding to two carriers. A first autonomous mobile network is established by the mobile unit 1 250-1 and contains only the sensor 6 230-6. A second autonomous mobile network is established by the mobile unit N 250-N and contains the sensors 7, 8, . . . , N 230-7, 230-8, . . . , 230-N. A server 280 is configured to receive data from, and perhaps also provide data to, the four explicitly-shown autonomous networks, as well as other networks not shown. In the illustrated embodiment, the mobile units 250-1, 250-N are further configured to communicate at a diminished frequency with the server 280 over a mobile network when out of range of any autonomous static networks.

Figure 4:
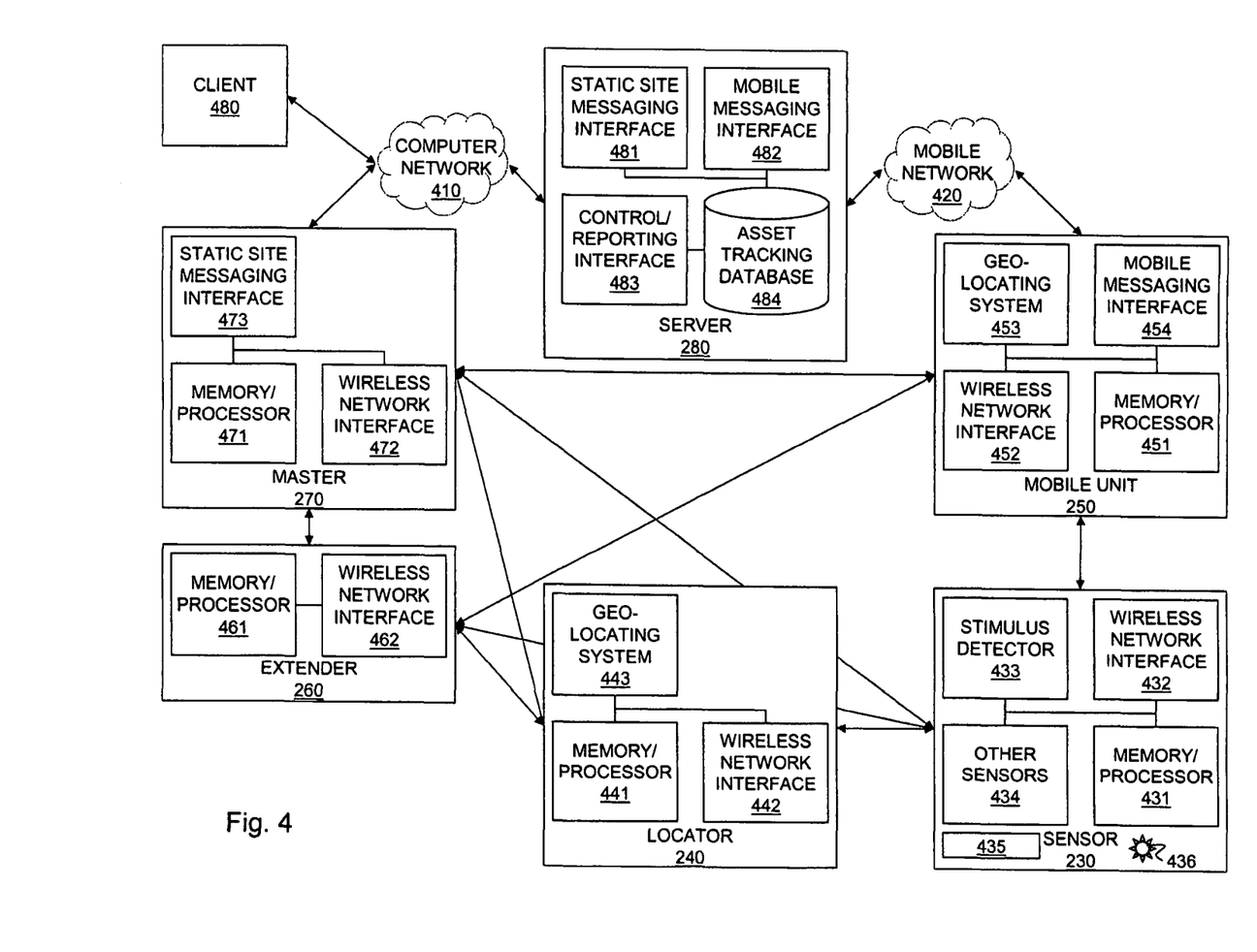
FIG. 4 is a block diagram of one embodiment of elements of the networks of FIG. 3.

FIG. 4 is a block diagram of one embodiment of elements of the networks of FIG. 3.

In general, a sensor is defined as a wireless network element configured to be associated with an asset, join an autonomous network, generate a signal when the asset is displaced and perhaps communicate other information about the asset and receive commands that control the operation of the asset. The illustrated embodiment of the sensor 230 includes a memory/processor 431, a wireless network interface 432, a stimulus detector 433, other sensors 434, a power source 435 and an indicator 436, which may be a visual indicator. The memory/processor 431 may be a microprocessor or a digital signal processor but is a system-on-a-chip (SoC) microcontroller in the illustrated embodiment. In the illustrated embodiment, the memory of the memory/processor 431 is configured to store data identifying an asset with which the sensor 230 is associated. Although not shown, the sensor 230 may contain an internal clock.

The wireless network interface 432 may be any type of wireless networking interface, but is an LR-WPAN interface in the illustrated embodiment. In one embodiment, the memory/processor 431 and the wireless network interface 432 are embodied on a single monolithic substrate commercially available as part no. JN5139 from Jennic Ltd. of Sheffield, England.

The stimulus detector 433 may be a motion sensor such as a single or multiple-axis accelerometer or any other stimulus detector that provides a signal when it is physically disturbed (e.g., translated, vibrated, rotated, jarred).

The other sensors 434 may include one or more of temperature sensors, pressure sensors, voltage sensors, current sensors or any other conventional or later-developed sensors as an application may find appropriate. The other sensors 434 may be employed to sense physical conditions of the asset with which the sensor 230 is associated, e.g., freezer temperature, tire pressure, battery voltage or equipment current draw.

Firmware is stored in the memory/processor 431 to enable the functions that the sensor 230 is to perform. Those functions may include detecting a stimulus, broadcasting a signal in response to a stimulus, transmitting messages containing data from the other sensors 434, receiving messages containing parameters that may alter its future operation and operating the indicator 436. Data, including parameters, may also be stored in the memory. The parameters may include: reporting periods, reporting conditions and setpoints. These parameters control the period of time separating a reporting of data from the other sensors (e.g., every minute), sensed conditions under which a reporting period may change (e.g., a dangerously low tire pressure) and points of control (e.g., a freezer temperature setpoint of −3° F.)

The power source 435 may include one or more batteries, solar cells or a mixture of these or other sources. The indicator 436 may be an incandescent or fluorescent lamp or a light-emitting diode or any other conventional or later-developed indicator.

In general, a locator is defined as a wireless network element configured to be associated with a host vehicle, join an autonomous network and provide an absolute location of the host vehicle, often as part of locating a sensor. The illustrated embodiment of the locator 240 includes a memory/processor 441, a wireless network interface 442 and a geolocating system 443. The memory/processor 441 may be of the type employed in the sensor 230.

The wireless network interface 442 may be of the type employed in the sensor 230. The geolocating system 443 provides data regarding the location of the locator 240 and may be, for example, a GPS receiver, in which case the data is an absolute geolocation of the locator 240.

The power source for the illustrated embodiment of the locator 240 is provided by its host vehicle, e.g., the crane, mule or forklift with which it is associated.

Firmware is stored in the memory/processor 441 to enable the functions that the locator 240 is to perform. Those functions may include receiving a signal broadcast from a sensor, conveying data regarding a location of a sensor to a master, relaying a message received from a sensor to an extender or a master and relaying a message from a master to a sensor.

In general, a mobile unit is defined as a wireless network element configured to be associated with a carrier, join and send information through an autonomous network and, under certain circumstances, form and send information through an autonomous mobile network, and communicate with a server. The illustrated embodiment of the mobile unit 250 includes a memory/processor 451, a wireless network interface 452, a geolocating system 453 and a mobile messaging interface 454. The memory/processor 451 may be of the type employed in the sensor 230 or the locator 240.

The wireless network interface 452 may be of the type employed in the sensor 230 or the locator 240. The wireless network interface 452 may take the form of a receiver that is separate from the remainder of the mobile unit 250. The geolocating system 453 provides data regarding the location of the mobile unit 250 and may be, for example, a GPS receiver, in which case the data is an absolute geolocation of the mobile unit 250.

The mobile messaging interface 454 may be any interface to a mobile network 420, such as a cellular telephone network, or a dedicated radio link to the server 280. In the illustrated embodiment, the mobile messaging interface 454 employs the Short Message Service (SMS) or Transmission Control Protocol/Internet Protocol (TCP/IP) to transmit messages to and receive messages from the mobile network 420. In general, however, the mobile messaging interface 454 is configured to transmit a mobile message to the server 280 and receive a mobile message from the server 280.

The power source for the illustrated embodiment of the mobile unit 250 is provided by its carrier, e.g., the ship, train, truck or airplane with which it is associated.

Firmware is stored in the memory/processor 451 to enable the functions that the mobile unit 250 is to perform. Those functions may include receiving a signal broadcast from a sensor, conveying data regarding a location of a sensor to a master, relaying a message received from a sensor to an extender or a master, relaying a message from a master to a sensor, establishing an autonomous mobile network; generating a message to a sensor, receiving a message from a sensor, generating a mobile message to a server, receiving a mobile message from a server and buffering data pending future communication with a master or a server.

In general, an extender is defined as a wireless network element configured to join, relay information through and perhaps participate in the configuration of an autonomous network. The illustrated embodiment of the extender 260 includes a memory/processor 461 and a wireless network interface 462. The memory/processor 461 may be of the type employed in the sensor 230, the locator 240 or the mobile unit 250.

The wireless network interface 462 may be of the type employed in the sensor 230, the locator 240 or the mobile unit 250. The extender 260 is typically coupled to a primary source of power (e.g., AC power), though this need not be the case.

Firmware is stored in the memory/processor 461 to enable the functions that the extender 260 is to perform. Those functions may include relaying a message received from a sensor, a locator or a mobile unit to another extender or a master and relaying a message from a master to a sensor, perhaps via one or more other extenders.

In general, a master is defined as a wireless network element configured to form, send information through and perhaps participate in the configuration of a static autonomous network and communicate with a server. The illustrated embodiment of the master 270 includes a memory/processor 471, a wireless network interface 472 and a static site messaging interface 473. The memory/processor 471 may be of the type employed in the sensor 230, the locator 240, the mobile unit 250 or the extender 260.

The wireless network interface 472 may be of the type employed in the sensor 230, the locator 240, the mobile unit 250 or the extender 260. The master 470 is typically coupled to a primary source of power (e.g., AC power), though this need not be the case.

The static site messaging interface 473 may be any interface to a computer network 410, such as the Internet, or a dedicated circuit to the server 280. In the illustrated embodiment, the static site messaging interface 473 employs Universal Serial Bus (USB) to transmit messages to and receive messages from the Internet. In an alternative embodiment, the static site messaging interface 473 employs TCP/IP. In general, however, the static site messaging interface 473 is configured to transmit a static site message to the server 280 and receive a static site message from the server 280.

Firmware is stored in the memory/processor 471 to enable the functions that the master 270 is to perform. Those functions may include establishing an autonomous static network, receiving a message from a sensor, a locator, a mobile unit or an extender, transmitting a message to a sensor, a locator, a mobile unit or an extender, transmitting a static site message to a server and receiving a static site message from a server.

In general, a server is defined as network element configured to communicate with one or more masters and one or more mobile units to gather and store information regarding assets and perhaps control the assets. The illustrated embodiment of the server 280 includes a static site messaging interface 481, a mobile messaging interface 482, a control/reporting interface 483 and an asset tracking database 484.

The static site messaging interface 481 may be any interface to the computer network 410. In the illustrated embodiment, the static site messaging interface 481 employs USB to transmit messages to and receive messages from the Internet. In an alternative embodiment, the static site messaging interface 481 employs TCP/IP. In general, however, the static site messaging interface 481 is configured to transmit a static site message to the master 270 and perhaps other masters and receive a static site message from the master 270 and perhaps other masters.

The mobile messaging interface 482 may be any interface to the mobile network 420. In the illustrated embodiment, the mobile messaging interface 454 employs SMS or TCP/IP to transmit messages to and receive messages from the mobile network 420. In general, however, the mobile messaging interface 482 is configured to transmit a mobile message to the mobile unit 250 and perhaps other mobile units and receive a mobile message from the mobile unit 250 and perhaps other mobile units.

The control/reporting interface 483 is configured to provide an interface for reporting data regarding, e.g., the locations of assets, data from the other sensors 434 and other data concerning the operation of the autonomous static and mobile networks. The control/reporting interface 483 is also configured to provide a means by which to control the autonomous static and mobile networks and the operation of their various elements and sensors. In the illustrated embodiment, the control/reporting interface 483 functions as a secure World Wide Web site for a client 480 via the computer network 410. The client 480, however, need not be coupled to the control/reporting interface 483 via a computer network; the client 480 may be directly coupled to the control/reporting interface 483.

The asset tracking database 484 provides a storage volume for data of all types collected during the operation of the autonomous static and mobile networks. In the illustrated embodiment, the asset tracking database employs the Structured Query Language (SQL) to allow data to be read therefrom or written thereto.

In one embodiment, the autonomous static and mobile networks described above may be configured and thereafter employed to determine the location of an asset. To configure an autonomous static network, a master first establishes an autonomous static network for a static site. Then the extenders, mobile units, locators and sensors that are in range of the master are joined to the autonomous static network. Generally speaking, the extenders and locators remain at the static site over time, while the mobile units and sensors come and go as assets come and go.

To configure an autonomous mobile network, a mobile unit, upon leaving range of any autonomous static networks, establishes an autonomous mobile network. In some embodiments, extenders and locators that are likewise out of range of any autonomous static networks are joined to the autonomous mobile network. This may be the case, for example, with a ship or a train, where an autonomous mobile network could be established to identify and locate containers with respect to its mobile unit. However, this certainly need not be the case, as extenders and locators are expected to be on the grounds of a static site and therefore in range of its corresponding autonomous static network. Therefore, as a practical matter, only the sensors associated with assets that the carrier associated with the mobile unit is moving are joined to the autonomous mobile network. In the illustrated embodiment, the autonomous mobile network continues in operation until the mobile unit encounters and joins an autonomous static network.

It is expected that a typical asset tracking infrastructure will contain far more sensors than other elements. It is also expected that the assets (shipping containers, trailers, crates, boxes, pallets, large equipment and the like) with which the sensors are associated are likely not to have power sources that can provide a persistent power supply for the sensors. Therefore, the embodiments of the sensors described above have their own power supply, typically including a battery and perhaps a solar cell. To extend the life of the power supply, it is advantageous to reduce power consumption.

One way to reduce power consumption is to reduce the sensor's complexity. Another way to reduce power consumption is to increase the amount of time the sensor remains in a low-power mode. One embodiment of a sensor that achieves the former power-saving objective lacks a geolocating system. Instead, a method is employed by which locators within range of the sensor are employed in an effort to deduce the sensor's location and therefore the associated asset's location. One embodiment of a sensor that achieves the latter power-saving objective has a stimulus detector. A novel recognition is that the location of an asset is static unless the asset is moved. If the asset remains static, no need exists to exit the low-power mode to ascertain location; a sensor that ascertains its location periodically would therefore waste power when it is static. The stimulus detector is configured to respond to a physical stimulus, such as the movement of a coupling or an acceleration, and trigger the sensor to exit a low-power mode. Accordingly, described herein are various embodiments of a method of determining a location of an asset employing a sensor that has a stimulus detector but lacks a geolocating system.

Figure 5:
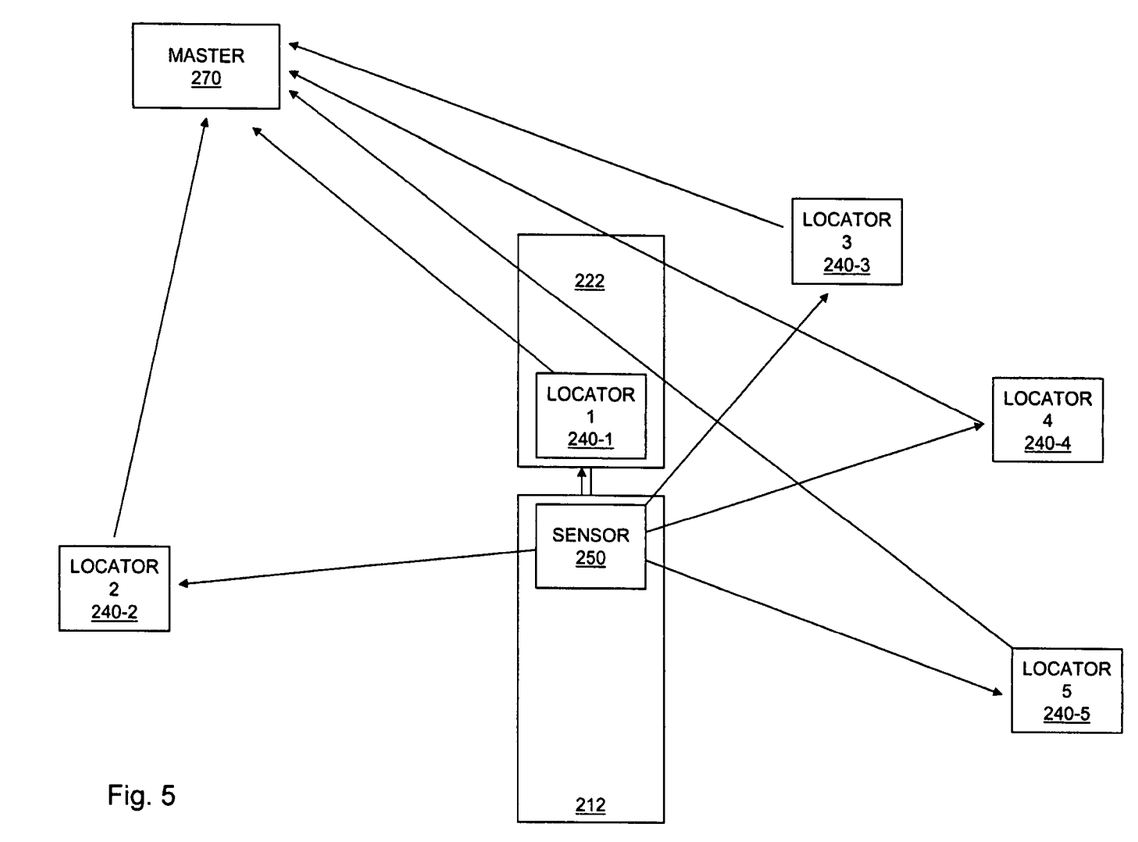
FIG. 5 is a block diagram of one embodiment of a method of determining a location of an asset.

FIG. 5 is a block diagram of one embodiment of a method of determining a location of an asset. The method will be described in the context of towing an asset, which is a common operation at a port, yard or distribution center. However, the method applies to any relocation of an asset. Shown are the shipping container 212, the sensor 250, the mule 222 and the master 270 of FIG. 2. Locators 240-1, 240-2, 240-3, 240-4, 240-5 are respectively associated with the mule 222 and other static site vehicles scattered about various locations over the grounds of a particular static site. To move the shipping container 212, the mule 222 backs up to the shipping container 212 and hitches up to it. For purposes of FIG. 2, it is assumed that the shipping container 212 has been stationary before the mule 222 hitches up to it. Therefore, the sensor 250 is in a low-power mode.

During the hitching, the operator of the mule 222 either may or may not move a coupling on the shipping container. Either way, the hitching jostles the shipping container 212. In one embodiment, the stimulus detector takes the form of a switch associated with the coupling; as the operator moves the coupling, the stimulus detector responds to that physical stimulus. In another embodiment, the stimulus detector takes the form of an accelerometer or tilt sensor (e.g., a reed or mercury switch) associated with any part of the shipping container 212; as the mule 222 jostles the shipping container 212, the stimulus detector responds to that stimulus. In yet another embodiment, the stimulus detector takes the form of a light sensor below the container 212 that senses light when the container 212 has been lifted or senses a lack of light when the container 212 has been placed down. It is advantageous that the generation of the stimulus be subsumed into the relocation of the asset, in other words that no steps are required of the operator in addition to those that displace the asset. However, some embodiments require one or more additional steps of the operator to generate the stimulus.

Irrespective of the mechanism for detecting the stimulus, the stimulus detector triggers the memory/processor in the sensor 250 (e.g., by means of an interrupt), which responds by causing the wireless network interface of the sensor 250 to broadcast an alert signal (e.g., a relatively short packet with no designated destination address and containing an alert message). The locators 240-1, 240-2, 240-3, 240-4, 240-5 all receive the signal, as arrows indicate. In response, each of the locators 240-1, 240-2, 240-3, 240-4, 240-5 transmits a message to the master 270 (perhaps through one or more extenders) containing the locator's identity (e.g., its Media Access Control, or MAC, address), the signal strength (e.g., reflected in the link quality indicator, or LQI) of the alert signal as received by the locators and the locator's location at the time the locator received the alert signal, as other arrows indicate.

The master 270 (or perhaps a server) then compares the various messages from the locators 240-1, 240-2, 240-3, 240-4, 240-5 to infer the location of the sensor 250. In one embodiment, the master 270 groups the messages according to time of arrival, regards the locator that received the strongest signal as being the closest to the sensor 250 and assigns the location of that locator to the sensor 250 and therefore its associated asset. It is assumed that signal strength or LQI is highly dependent on distance. From LQIs distances can be approximated (signal strength being proportional to the reciprocal of the square of the distance, and distance therefore being proportional to the reciprocal of the square root of the signal strength) between the sensor and several locators. Triangulation may then be employed to infer the position of the sensor 250. In an alternative embodiment, the master 270 employs a relatively sensitive time-of-arrival algorithm (analogous to that employed by GPS systems) to identify the locator that is closest to the sensor 250. Triangulation using time-of-arrival is relatively difficult, but also falls within the scope of the invention.

In one embodiment, the process of broadcasting alert signals and transmitting messages from locators that received the broadcast is repeated, perhaps periodically, until the stimulus detector of the sensor 250 is no longer subjected to disturbance. At that time, it may safely be assumed that the move of the asset has been completed and that the asset is stationary. The asset's last inferred location then may be assumed to be valid until the stimulus detector receives another stimulus.

Figure 6:
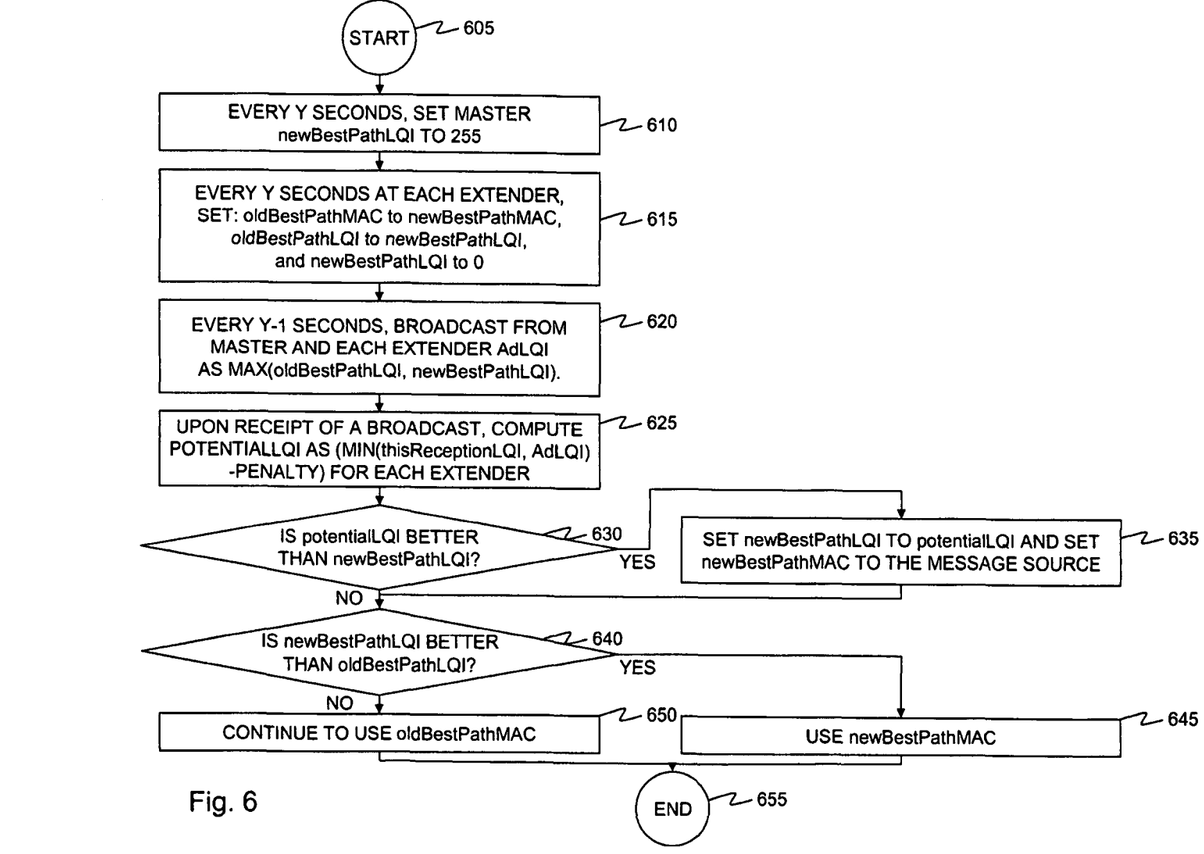
FIG. 6 is a flow diagram of one embodiment of a method of configuring an autonomous static or mobile wireless network.

In one embodiment, the autonomous static or mobile networks are LR-WPANs. As such, they are capable of adaptively reconfiguring themselves to accommodate changes in relative locations of elements or changing signal propagation characteristics resulting in changes in signal strength and link quality. FIG. 6 is a flow diagram of one embodiment of a method of configuring or reconfiguring an autonomous static or mobile wireless network. The method may be employed to establish the best topological path through an autonomous static networks to a master or an autonomous mobile network to a mobile unit in order to pass messages to the master or mobile unit, as the case may be. The network may be any network and does not have to be one dedicated to asset tracking. The variable names that are used are only examples.

The method begins in a start step 605. In a step 610, the master sets its master new best path link quality indicator (newBestPathLQI) to a maximum value (e.g., 255) at a first frequency, e.g., every Y seconds. In one embodiment, Y is less than 10 seconds, though all values of Y are within the scope of the invention.

In a step 615, each extender sets its extender old best path element identifier (e.g., MAC address) (oldBestPathMAC) equal to an extender new best path element identifier (newBestPathMAC), its extender old best path LQI (oldBestPathLQI) to its extender new best path LQI (newBestPathLQI) and then its newBestPathLQI to a minimum value (e.g., 0) at a second frequency. In one embodiment, the second frequency equals the first frequency.

In a step 620, the masters and each extender broadcasts its best LQI as the maximum of oldBestPathLQI and newBestPathLQI. The step 620 is carried out at a third frequency that is higher than the first frequency and the second frequency, guaranteeing the currency of newBestPathLQI. This value is called AdLQI.

In a step 625, upon receipt of the broadcast of the step 620, each extender computes an extender potential link quality indicator (potentialLQI) as the minimum of an LQI pertaining to the broadcast (thisReceptionLQI) and AdLQI. Some penalty may be included in the computation.

In a step 630, potentialLQI is compared to newBestPathLQI. In a step 635, if potentialLQI is greater than newBestPathLQI, newBestPathLQI is set to potentialLQI, and newBestPathMAC is set to the source of the message.

If potentialLQI is not greater than newBestPathLQI, in a step 640, newBestPathLQI is compared to oldBestPathLQI. In a step 645, if newBestPathLQI is greater than oldBestPathLQI, the element corresponding to newBestPathMAC is used for future network transmissions. Otherwise, the element corresponding to oldBestPathLQI continues to be used for future network transmissions in a step 650. The method ends in an end step 655.

Figure 7:
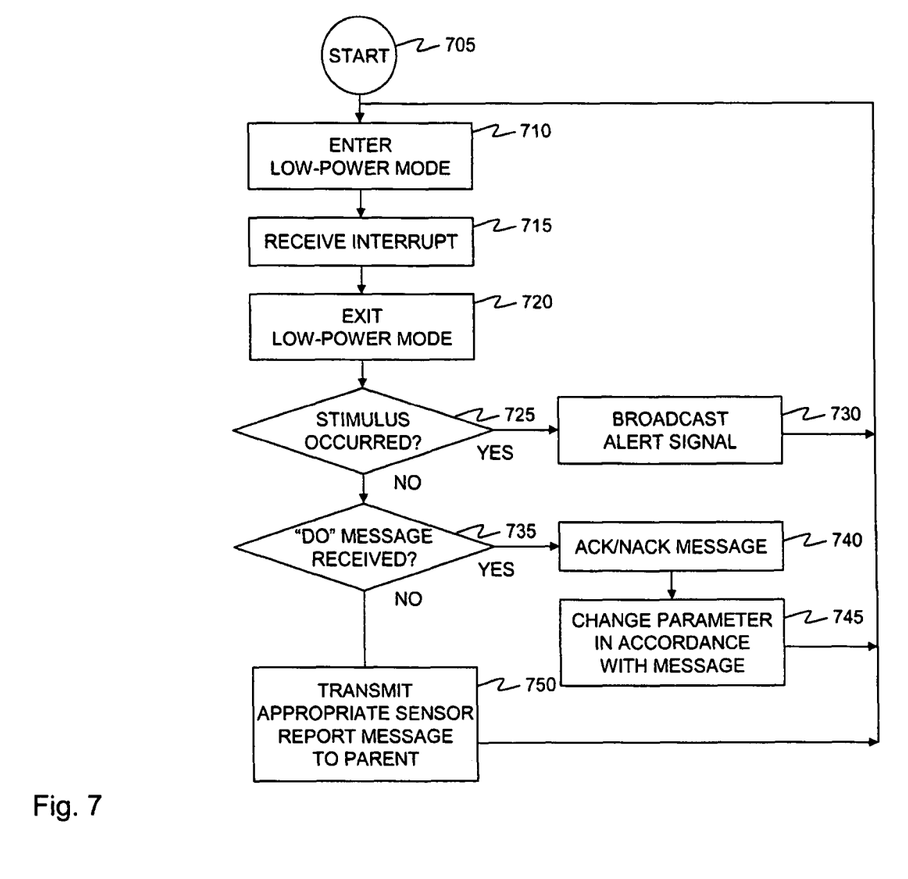
FIG. 7 is a flow diagram of one embodiment of a method of operating a sensor.

FIG. 7 is a flow diagram of one embodiment of a method of operating a sensor. The method begins in a start step 705. In a step 710, the sensor enters a low-power mode in which power consumption is significantly reduced, enabling extended power supply lifetime. In a step 715, an interrupt is received. In a step 720, the sensor exits the low-power mode to ascertain the nature of the interrupt. In a step 725, the sensor determines whether or not a stimulus has occurred. If so, the sensor broadcasts an alert signal in a step 730 and then re-enters the low-power mode in the step 710. If not, in a step 735, the sensor determines whether a message has been received that changes an operating parameter. If so, the sensor sends a message acknowledging or non-acknowledging receipt of the received message in a step 740, changes one or more parameters in accordance with the message and the acknowledgement or non-acknowledgment in a step 745 and then re-enters the low-power mode in the step 710. If not, it is assumed that a reporting period has expired (resulting in a due time for a report) or a reporting condition has been met. Thus, the sensor transmits an appropriate sensor report to its parent (i.e., the master or an extender if the sensor is joined in an autonomous static network or a mobile unit if joined in an autonomous mobile network) in a step 750 and then re-enters the low-power mode in the step 710.

Figure 8:
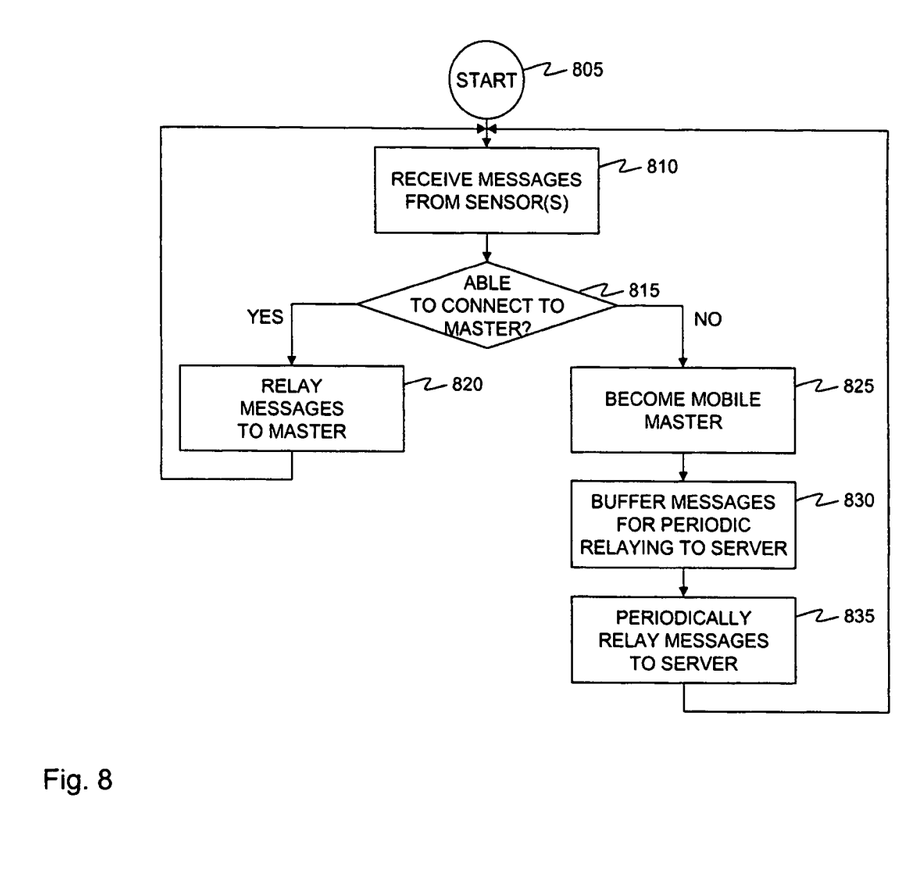
FIG. 8 is a flow diagram of one embodiment of a method of operating a mobile unit.

FIG. 8 is a flow diagram of one embodiment of a method of operating a mobile unit. The method begins in a start step 805. In a step 810, the mobile unit receives messages from one or more sensors. In a step 815, it is determined whether or not the mobile unit is able to connect to a master. If it is, it is because the mobile unit has employed its wireless network interface to join an autonomous static network. The mobile unit then relays the messages from the one or more sensors to the master (perhaps via one or more extenders) in a step 820.

If the mobile unit is not able to connect to a master, it is because the mobile unit is out of range of an autonomous static network. The mobile unit therefore employs its wireless interface to create an autonomous mobile network in a step 825. The mobile unit then buffers messages for periodic relaying to the server (by way of a mobile network in one embodiment) in a step 830. In a step 835, the mobile unit then periodically relays the messages to the server. The mobile unit may relay the messages to a master of an autonomous static network if the mobile unit is in possession of buffered, unrelayed messages when it is able to join the autonomous static network.

Those skilled in the art to which the invention relates will appreciate that other and further additions, deletions, substitutions and modifications may be made to the described embodiments without departing from the scope of the invention.

What is claimed is:

1. A system for assets supply distribution chain, comprising:
    collapsing multiple geographically overlapping static and mobile networks;
    creating a mobile network, a subset of autonomous static network;
    creating a mobile network, a subset of original mobile network; and converting and creating a new mobile network, a subset of autonomous static network or a mobile network;
    masters associated with static sites and configured to establish autonomous static networks for said static sites;
    mobile units associated with carriers and configured to join said autonomous static networks when in range thereof and create autonomous mobile networks when out of range of said autonomous static networks: and
    sensors associated with assets and configured to join said autonomous static networks when in range thereof and join said autonomous mobile networks when out of range of said autonomous static networks, the sensors storing data identifying the assets with which the sensors are associated and enabling communication to an asset tracking network, in response to a specified activation criterion or criteria, of an asset identification signal representing the data identifying the asset;
    autonomous static network apparatus, associated with a static site vehicle, that enables receipt of communication of an asset identification signal when the sensor is within range of the autonomous static network apparatus, determination of the strength of the asset identification signal, identification of the location of the autonomous static network apparatus, and communication of data regarding the asset identification signal and autonomous static network apparatus location to apparatus that is remote from the static site vehicle; and
    autonomous mobile network apparatus, associated with a carrier, that enables receipt of communication of an asset identification signal, identification of the location of the autonomous mobile network apparatus, and communication of the asset identification and autonomous mobile network apparatus location to apparatus that is remote from the carrier.

2. The system as recited in claim 1 wherein a server comprises the apparatus that is remote from the static site vehicle and the apparatus that is remote from the carrier.

3. The system as recited in claim 1 wherein the server comprises a control/reporting interface that enables reporting of information regarding the tracking of the asset, information regarding other characteristics of the asset, and/or information regarding operation of the autonomous static network apparatus and the autonomous mobile network apparatus.

4. The system as recited in claim 3 wherein the server enables storage of data regarding the reporting information.

5. The system as recited in claim 1 wherein the server comprises a control/reporting interface that enables control of the sensor, autonomous static network apparatus and/or autonomous mobile network apparatus to be effected.

6. The system as recited in claim 1 wherein the steps of picking up an orphan sensor by a mobile network comprises:
    joining an orphan sensor associated with an asset to said mobile network when said sensor is in range thereof; and
    thereafter the said sensor is part of the said mobile network.

7. The system as recited in claim 1 wherein the steps of collapsing multiple geographically overlapping static and mobile networks, comprises:
    joining a sensor associated with an asset of a mobile network to said autonomous static network when said sensor is in range thereof; and
    thereafter the mobile network is collapsed and is part of the autonomous static network,
    joining a sensor associated with an asset of an autonomous static network to said mobile network when said sensor is in range thereof; and
    thereafter the autonomous static network is collapsed and is part of the mobile network.

8. The system as recited in claim 1 wherein the steps of creating a mobile network, a subset of autonomous static network, comprises:
    joining a sensor associated with an asset to said mobile network when said sensor is in range thereof; and thereafter the new mobile network is a subset of the original autonomous static network.

9. The system as recited in claim 1 wherein the steps of creating a mobile network, a subset of original mobile network, comprises:
- joining a sensor associated with an asset to said mobile network when said sensor is in range thereof; and thereafter the new mobile network is a subset of the original mobile network.

10. The system as recited in claim 1 wherein the steps of creating new mobile network, a subset of autonomous static network or a mobile network, comprises:
- sensors that are out of range of the autonomous static network;
- sensors that are out of range of the mobile unit;
- employing one of the out of range sensor to establish a new mobile unit;
- joining out of range sensor associated with an asset to said new mobile unit when said sensor is in range thereof; and
- thereafter employing the new mobile unit to create new mobile network.

* * * * *